United States Patent
Doubler et al.

(10) Patent No.: US 7,118,303 B2
(45) Date of Patent: Oct. 10, 2006

(54) INTERNALLY DISPOSED LINEAR FASTENER SYSTEM

(75) Inventors: Robert L. Doubler, Ida, MI (US); John E. Hammill, Sr., Rossford, OH (US)

(73) Assignee: Zimmer Spine, Inc., Minneapolis, MN (US)

( * ) Notice: Subject to any disclaimer, the term of this patent is extended or adjusted under 35 U.S.C. 154(b) by 0 days.

(21) Appl. No.: 10/733,160

(22) Filed: Dec. 10, 2003

(65) Prior Publication Data

US 2005/0129459 A1   Jun. 16, 2005

(51) Int. Cl.
*F16D 1/00* (2006.01)
(52) U.S. Cl. .................. 403/362; 403/315; 403/316; 403/319; 403/373; 411/75; 411/271
(58) Field of Classification Search ............ 403/16, 403/19, 315, 316, 319, 362, 373; 411/271, 411/512, 75, 395
See application file for complete search history.

(56) References Cited

U.S. PATENT DOCUMENTS

| | | | |
|---|---|---|---|
| 255,428 A | 3/1882 | Graham | |
| 590,294 A | 9/1897 | Archer | |
| 2,900,863 A | 8/1959 | Maynard | |
| 3,618,135 A * | 11/1971 | Weller | 333/232 |
| 4,378,187 A | 3/1983 | Fullerton | |
| 4,411,570 A | 10/1983 | Juric | |
| 4,419,026 A | 12/1983 | Leto | |
| 4,653,969 A | 3/1987 | Summerlin et al. | |
| 4,684,284 A | 8/1987 | Bradley, Jr. | |
| 4,822,223 A | 4/1989 | Williams | |
| 4,836,196 A | 6/1989 | Park et al. | |
| 4,854,304 A | 8/1989 | Zielke | |
| 4,887,595 A | 12/1989 | Heinig et al. | |
| 4,887,596 A | 12/1989 | Sherman | |
| 4,946,458 A | 8/1990 | Harms et al. | |
| 4,976,577 A | 12/1990 | Brown et al. | |
| 5,002,542 A | 3/1991 | Frigg | |
| 5,110,244 A | 5/1992 | Garman | |
| 5,129,900 A | 7/1992 | Asher et al. | |
| 5,133,717 A | 7/1992 | Chopin | |
| 5,244,323 A | 9/1993 | Tucchio | |
| 5,324,150 A | 6/1994 | Fullerton | |
| 5,333,977 A * | 8/1994 | Sugawara | 411/271 |
| 5,427,488 A | 6/1995 | Fullerton et al. | |
| 5,487,744 A | 1/1996 | Howland | |
| 5,549,608 A | 8/1996 | Errico et al. | |
| 5,569,247 A | 10/1996 | Morrison | |
| 5,591,166 A | 1/1997 | Bernhardt et al. | |

(Continued)

FOREIGN PATENT DOCUMENTS

DE   197 20 782 A 1   11/1998

(Continued)

*Primary Examiner*—Daniel P. Stodola
*Assistant Examiner*—Michael P. Ferguson
(74) *Attorney, Agent, or Firm*—Wood, Herron & Evans, LLP

(57) ABSTRACT

The present invention provides a linear locking set screw system capable of rapid linear engagement and disengagement. More specifically, the system utilizes a threaded outwardly expandable set screw and an expander member which are constructed and arranged to thread easily into a threaded aperture while in a first release position and can thereafter be securely locked in place and/or provide a secondary clamping force in a second engaged position. In this manner, the linear fastener system is capable of providing a precise, secure, and reproducible connection between multiple components without the need to apply rotational torque to the assembly.

6 Claims, 6 Drawing Sheets

U.S. PATENT DOCUMENTS

| | | |
|---|---|---|
| 5,613,816 A | 3/1997 | Cabahug |
| 5,613,968 A | 3/1997 | Lin |
| 5,628,740 A | 5/1997 | Mullane |
| 5,653,765 A | 8/1997 | McTghe et al. |
| 5,716,357 A | 2/1998 | Rogozinski |
| 5,746,566 A * | 5/1998 | Pfarr et al. ............... 414/752.1 |
| 5,749,690 A | 5/1998 | Kutz |
| 5,788,443 A | 8/1998 | Cabahug |
| 5,800,108 A | 9/1998 | Cabahug |
| 5,800,435 A | 9/1998 | Errico et al. |
| 5,816,761 A | 10/1998 | Cassatt |
| 6,050,997 A | 4/2000 | Mullane |
| 6,063,090 A | 5/2000 | Schlapfer |
| 6,090,111 A | 7/2000 | Nichols |
| 6,102,952 A | 8/2000 | Koshino |
| 6,162,234 A | 12/2000 | Freedland et al. |
| 6,179,512 B1 | 1/2001 | Gibson et al. |
| RE37,227 E | 6/2001 | Brodbeck |
| 6,254,602 B1 | 7/2001 | Justis |
| 6,537,005 B1 | 3/2003 | Denham |
| 6,602,255 B1 | 8/2003 | Campbell et al. |
| 6,623,485 B1 | 9/2003 | Doubler et al. |
| 6,712,544 B1 * | 3/2004 | Kruger et al. ........... 403/408.1 |
| 2002/0114680 A1 | 8/2002 | Stoewer |
| 2003/0073996 A1 | 4/2003 | Doubler et al. |
| 2003/0149487 A1 | 8/2003 | Doubler et al. |
| 2004/0006342 A1 | 1/2004 | Altarac et al. |

FOREIGN PATENT DOCUMENTS

| | | |
|---|---|---|
| DE | 100 05 386 A 1 | 8/2001 |
| WO | WO 00/15125 | 3/2000 |

\* cited by examiner

INTERNALLY DISPOSED LINEAR FASTENER SYSTEM

FIELD OF THE INVENTION

The present invention relates to an internally disposed linear fastener system. More specifically, to a linear engaging set screw system utilizing an outwardly expandable set screw in combination with an internal linear traversable sleeve member. The inner sleeve member is capable of rapid linear traversing engagement and disengagement to form a versatile and effective vibration resistant fastener system which may be used to reproducibly interconnect disparate components.

BACKGROUND OF THE INVENTION

In general, a fastener is any device used to connect or join two or more components to create an assembly. In the field of manufacturing there are numerous assembly processes requiring individual components to be joined with fasteners to create an assembled product. Most of these processes, requiring fixations of one component in relation to another, are currently performed using threaded fasteners for connections. The most common threaded fasteners are referred to by many names, among them: bolts, screws, nuts, studs, lag screws, and set screws.

When a bolt is used to clamp two parts together, the force exerted between the parts is generally referred to as the clamping load. A clamping load is produced by exerting a rotational torque on a threaded fastener that is converted to linear travel via the helical threads. These forces keep the threads of the mating parts in intimate contact and decrease the probability of the fastener loosening in service. However, it is well known that threaded fasteners loosen over time when the part to which the fastener is affixed is subjected to shock or vibration. This is particularly true of threaded type fasteners used on devices with moving parts or in conjunction with motors or vehicles. To prevent this loosening, locking fasteners, lock washers, plastic inserts in the nut or bolt, adhesives, cotter pins, locking tabs, etc., are available to hold a threaded fastener in place until it is purposefully loosened. Most of these locking devices cooperate in one way or another with the head of the fastener.

However, in many fastening applications a typical bolt with a head cannot be used; for example, in situations where a head would limit the distance the bolt could be tightened into an aperture or where a protruding head on a moving or rotating part could damage equipment or personnel. In these situations a set screw is typically used in place of a bolt. Devices such as lock washers cannot be used to hold headless fasteners in place and thus they are especially prone to loosening. A typical application for set screws is securing collars to shafts. In these applications, a set screw is tightened within a threaded aperture in a collar to apply pressure to the side of the shaft. Because the set screws are subjected to shock each time the shaft is started and vibration while the shaft is rotating, the set screws often loosen over time increasing the required machinery maintenance.

In the past, alternate methods for locking a set screw to a part, thereby preventing the screw from loosening have been employed. These methods include staking the set screw to the part, using plastic or elastomeric inserts to bind the threads, and the use of thread locking adhesives to adhere the threads of the set screw to the threads of the part. Each of these solutions has inherent problems associated therewith. Staking the set screw to the part requires prick punching the boundary between the set screw and the part. This method creates an unsightly surface on the part and, over multiple lockings, damages both the set screw and the part. Plastic inserts require additional and costly manufacturing processes and require the fastener to be replaced after one use. Using an adhesive substance with the set screw can destroy the set screw and clog threads in the part.

With reference to the field of orthopedic surgery there are various procedures which require insertion of an anchor, pin, peg, screw or cage into skeletal bone for the purpose of correcting anatomical defects. Related orthopedic procedures include reconstruction, such as the formation of artificial joints and teeth. All of these procedures, requiring fixations of an appliance in the bone, are currently performed using threaded connections between the components. For example, in many spinal corrections, pedicle screws are placed in the vertebrae to support cages or plates for fixing spatial orientation. The connection of the screws to the ancillary devices usually require concomitant application of torque to the vertebrae through the pedicle screw. Similarly, in placing artificial teeth on screw-like pegs inserted in the jaw bone, a particular degree of torque may be applied in the course of fitting of the teeth. Thereafter, attachment of auxiliary devices to the screw-like pegs, using fasteners that require torque, may be detrimental to the integrity of the pre-torqued screws securement within the bone.

Accordingly, what is lacking in the prior art is a cost effective internally disposed linear fastening system, particularly a locking set screw system capable of linear engagement+. The set screw locking system should achieve objectives such as providing improved manufacturing and assembly efficiency, effective reliable performance, corrosion resistance, and torqueless locking assembly. The system should include packaging flexibility for installation on various products, including retrofitting existing product configurations with minimal modification of the original product.

DESCRIPTION OF THE PRIOR ART

A number of prior art threaded locking fasteners exist for attaching components together to form an assembly. Most of these fasteners are designed to lock when the end of the fastener contacts a surface at the end of an aperture. For example, U.S. Pat. No. 2,900,863 teaches a two piece expansion bolt with a cylindrical shank and an expansion plug. When the shank of this fastener is driven into an aperture, the expansion plug acts to expand and wedge the lower end of the fastener against the walls of the aperture. The wedged lower end of the bolt prevents the bolt from turning when a cooperating nut is threaded onto the upper end of the bolt. Some disadvantages of this prior art invention are that the fastener is not easily removable from the aperture and the bolt is not designed for use in a threaded aperture.

Two other locking fastener designs are disclosed by U.S. Pat. Nos. 4,411,570 and 4,976,577. These patents teach hollow, threaded, locking bolts constructed to cooperate with a threaded aperture. Within the hollow center portion of the bolt is a plunger that may be driven through the center of the fastener to expand the lower end of the fastener outwardly against the sides of the threaded aperture. The disadvantage of these inventions is that they are difficult to remove. In addition they require small diameter and precisely machined internal bores through the center of the bolt. The small bores are difficult to machine and add significant cost to the fasteners.

It is also known in the prior art to provide various fasteners capable of partial linear and partial rotational engagement. These fasteners generally feature radially inwardly or outwardly biased arcuate segments mounted to engage the threads of a bolt, nut or other threaded member. The threaded segments are generally movably mounted within a casing or around a shaft and resiliently urged inwardly or outwardly. Typically the devices are provided with axially spaced apart radially inwardly directed surfaces of revolution, such as frustoconical surfaces, extending at a common acute angle to the axis of the fastener. In this manner the fasteners and couplings may be secured by merely pushing the threaded components together, thereafter final tightening is accomplished by rotation of the fasteners.

U.S. Pat. No. 5,788,443 teaches a male coupling device featuring movably mounted threaded members which are capable of rapid engagement and disengagement with respect to the stationary threads of a female coupling device. The male coupling device includes a handled shaft having a plurality of threaded segments surrounding the shaft. A sleeve is mounted to move relative to the handle to move the threaded segments inwardly and outwardly to effectively vary the diameter of the assembled threaded elements.

U.S. Pat. No. 5,244,323 teaches a threaded, locking set screw having a threaded body, a resilient expansion plug, and a retaining wedge. The threaded body has a tapered cavity at its bottom end. The expansion plug and retaining wedge are aligned and inserted into the cavity in the bottom portion of the body. The base of the plug extends outwardly from the cavity, and the plug is held in place by a force fit between the wedge and a retaining slot in the body. When the set screw is tightened against a part, the plug is forced into the cavity. Because of a locking taper between the plug and the cavity, the plug exerts an outward force on the inner surface of the cavity causing the set screw body to expand radially, thus, locking the set screw in place.

While the prior art devices allow the fastener to engage the sides of an aperture for locking purposes, these devices require extensive machining of thin sections and require difficult manufacturing processes. This combination results in high production cost and weak finished components. In addition, the designs of the prior art devices do not lend themselves to traditional fastener manufacturing techniques, e.g. cold forming—a manufacturing technique which is known to result in much stronger and more reliable fasteners, thread rollers, pointers, nut tappers, slotters, shavers etc., adding to the high manufacturing cost and reducing the strength of the fasteners.

Thus in one illustrated embodiment, the present invention teaches a linear locking set screw system that includes a standard diameter threaded set screw and an inner compressing ring member that is capable of rapid linear actuated locking engagement and/or disengagement. In a second illustrated embodiment the present invention teaches a linear locking set screw that is capable of applying precise secondary clamping force to disparate assembled components without requiring rotation of the fastening members.

SUMMARY OF THE INVENTION

The present invention provides a linear locking set screw system capable of rapid linear engagement and disengagement. More specifically, the system utilizes a threaded outwardly expandable set screw and an expander member which are constructed and arranged to thread easily into a threaded aperture while in a first release position and can thereafter be securely locked in place and/or provide a secondary clamping force in a second engaged position.

In a first embodiment, the set screw member is constructed and arranged with a standard sized outer threaded surface and an inner cavity including a driving and a frustaconical surface, the expander member being constructed and arranged with an inner threaded surface and an outer frustaconical surface preferably conjugate in shape with respect to the inner frustaconical surface of the set screw member. In operation the set screw body is threaded into a threaded aperture and tightened to a desired torque. Thereafter, the set screw body is locked in place by traversing the expander member in a linear fashion along the axis of rotation of the set screw, so as to insert said expander member within the inner cavity in the upper portion of the set screw body, thereby utilizing the frustaconical surfaces to expand the set screw body and place a compressive load on the expander member to expand the set screw body to grip the inner threaded aperture surface.

In a second embodiment, the set screw body member is constructed and arranged with an undersized diameter threaded surface and an inner cavity including a driving and a frustaconical surface, the expander member being constructed and arranged with an inner threaded surface and an outer frustaconical surface preferably conjugate in shape with respect to the inner frustaconical surface of the set screw body member. In operation the set screw body is threaded into a threaded aperture until the distal end of the set screw contacts the desired surface. The expander member is inserted in a linear fashion into the cavity in the upper portion of the set screw body, thereby utilizing the frustaconical surfaces to expand the set screw body and place a compressive load on the expander member to expand the set screw outwardly. As the set screw body is expanded the threaded surfaces cooperate in a helical or circular ramping fashion to force the set screw downward, thereby causing a secondary clamping load between the components.

In this manner, the locking set screw system is capable of providing a precise, secure, and reproducible connection between multiple components. The connection also allows full thread engagement and a locking connection without the need for plastic inserts or adhesives. When compared to traditional threaded set screws, the dual frustaconical compression surfaces allow very precise clamping loads to be applied to the assembled components with or without application of rotational torque. Prior art designs require torque wrenches to apply measured clamping loads to fasteners. Linear expansion of the set screw member eliminates torque variations as seen in the prior art due to surface finish, lubrication and thread engagement to achieve a precise clamping load.

Accordingly, it is a primary objective of the present invention to provide an internally disposed linear fastener system capable of precisely and reproducibly securing multiple components into a single assembly without necessitating the concomitant application of rotational torque to previously created sub-assemblies.

An additional objective of the present invention is to provide a fastener system capable of precise and reproducible linear engagement and disengagement.

It is a further objective of the present invention to provide a fastener system capable of providing precise and reproducible linear engagement to internally threaded surfaces and the like.

A still further objective of the present invention is to provide a fastener system capable of providing precise and reproducible linear engagement to internal circular ramps and the like.

Yet another objective of the present invention is to provide a fastener system suited for automated manufacturing and assembly.

Still yet another objective of the present invention is to provide a fastener system that enables close spacing of the assembled components and does not require wrench clearances.

Yet a further objective of the instant invention is to teach the use of linear fasteners for modular implants having an element anchored in bone and a support element for ancillary devices, each with a cooperating coupling component adapted to be secured together without rotational torque forces.

An additional objective of the instant invention to teach a linear coupling device for medical implants with a pressure limiting element.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

Although the invention is described in terms of a preferred specific embodiment, it will be readily apparent to those skilled in this art that various modifications, rearrangements and substitutions can be made without departing from the spirit of the invention. The scope of the invention is defined by the claims appended hereto.

Figure 1:
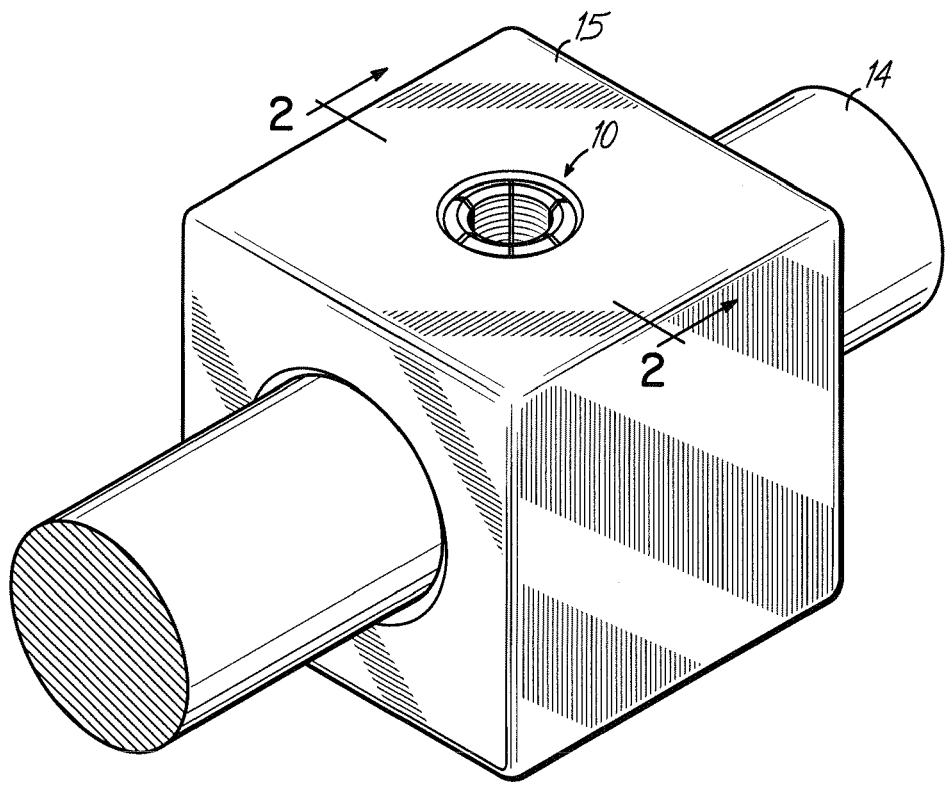
FIG. 1 shows a perspective view of one embodiment of the instant invention being utilized to secure a shaft within a component.
Figure 2:
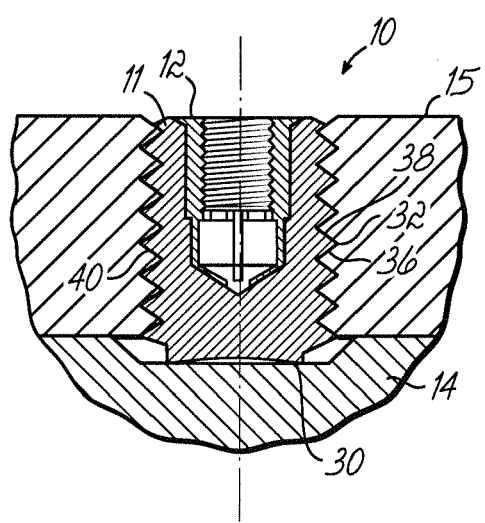
FIG. 2 shows a section view along line 1—1 of the embodiment illustrated in FIG. 1, illustrating the set screw body member with the expander member in the engaged position.

Referring to FIGS. 1 and 2, the linear engaging headless set screw 10 utilized to secure the shaft 14 within a machinery component 15 is a representation of the general utility of the present invention. The linear engaging headless set screw 10 of the instant invention generally comprises an axially aligned body member 11 and expander member 12.

Figure 3:
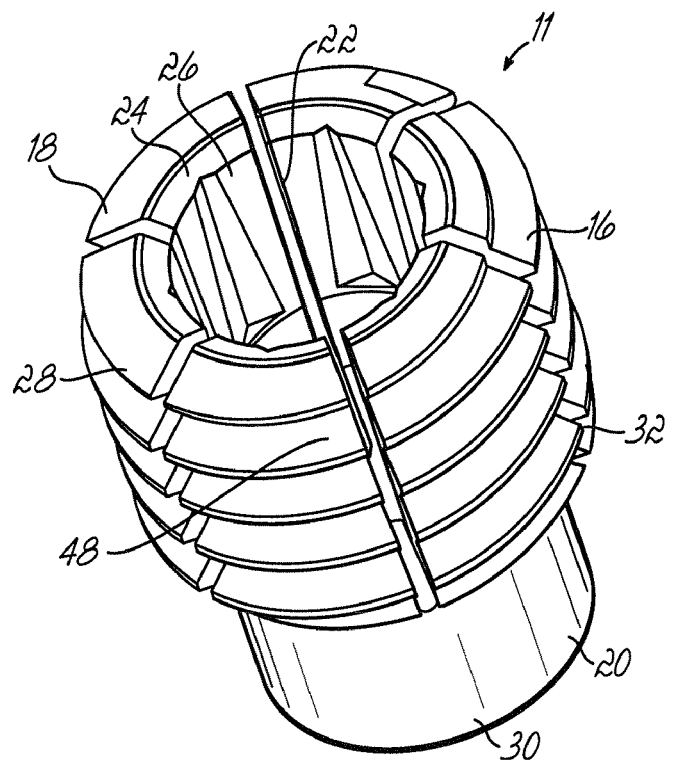
FIG. 3 shows a perspective view of one embodiment of the set screw body member of this invention.
Figure 7:
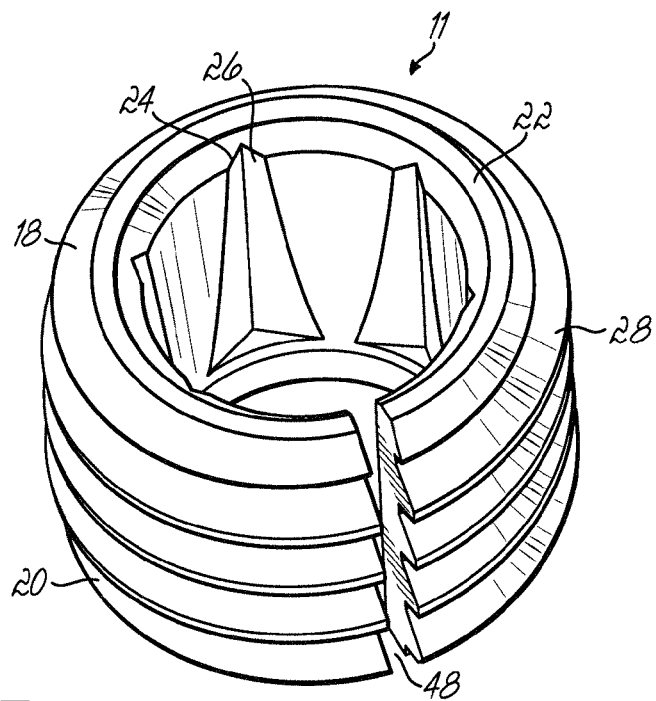
FIG. 7 shows a perspective view of one embodiment of the set screw body member of this invention.

Referring to FIGS. 3 and 7, the body member 11 comprises a generally cylindrical outer surface 16 having a first end 18 and a second end 20. The body member 11 may be constructed of materials well known in the art which may include but should not be limited to steel, bronze, brass, copper, aluminum, plastic, ceramic, or rubber, as well as suitable combinations thereof. The first end 18 of the body member 11 includes a cavity 22 and a driving means. In the preferred embodiment the cavity 22 includes an engaging surface 26, the engaging surface tapering inwardly beginning at the first end and extending toward the second end of the body member 11. In the preferred embodiment the engaging surface includes a self-holding taper such as a MORSE, BROWN & SHARPE (JARNO), AMERICAN NATIONAL STANDARD MACHINE TAPER (JACOBS), BRITISH STANDARD TAPERS and the like all well known in the art. Alternatively, self-releasing tapers will known in the art suitable for circumferential expansion of the upper portion 28 of the body member 11 may be used. The driving means comprises at least one and preferably a plurality of driving surfaces 24. In the preferred embodiment the driving surfaces 24 are constructed and arranged to cooperate with a standard hex wrench (not shown). However, it should be noted that other spline and slot type driving sockets well known in the art suitable for inserting and removing threaded fasteners may also be used. The second end 20 of the set screw body is constructed and arranged as a clamping surface 30 (FIG. 2). The clamping surface 30 in the preferred embodiment is a flat point. However, it should be noted that other set screw points (not shown) such as a dog point, half dog point, cup point, oval point, cone point or knurled point, all well known in the art, may be utilized with the instant invention. The body member 11 preferably includes a radially projecting means for engaging the inner surface of an aperture illustrated herein as outwardly and circumferentially extending rib(s) 32 (FIG. 2) positioned about a central axis. Each circumferentially extending rib 32 being constructed with a first ramp surface 36 to allow the set screw member to slide into the aperture and a second ramp surface 38 to allow a second clamping force as the engagement of expander 12 causes radial expansion of the set screw body 11. In further embodiments, the outer gripping surface may also include any number of surface finishes well known in the art to enhance the gripping action between the set screw body and cooperating aperture, including but not limited to, threads, knurling, snap ring grooves, generally smooth and/or tapers, or suitable combinations thereof, as well as other surfaces suitable for providing adequate grip between the set screw body 11 and the inner surface of an aperture 40 to secure an assembly. The upper portion 28 of the body 11 includes at least one generally vertical slot 48 extending from the upper portion 28 of the set screw body 11 toward the second end 30. The vertical slot(s) 48 facilitates translation of the radial and outward forces created upon insertion of the expander member within the upper portion 28 of the body member 1 into a relatively uniform circumferential expansion of said body member 11.

Figure 10:
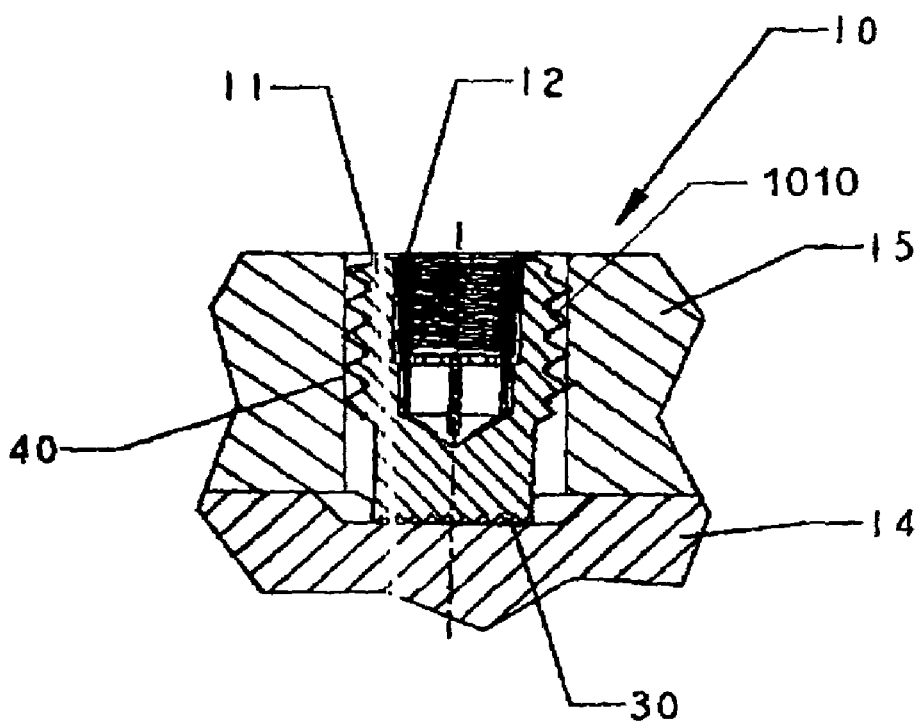
FIG. 10 schematically shows an alternative embodiment of the invention, wherein the clamping surface and the radially projecting means on the outer surface of the set screw include knurled surfaces.

Knurled clamping surface 30 and outer gripping surface 1010 are schematically shown in FIG. 10.

Figure 4:
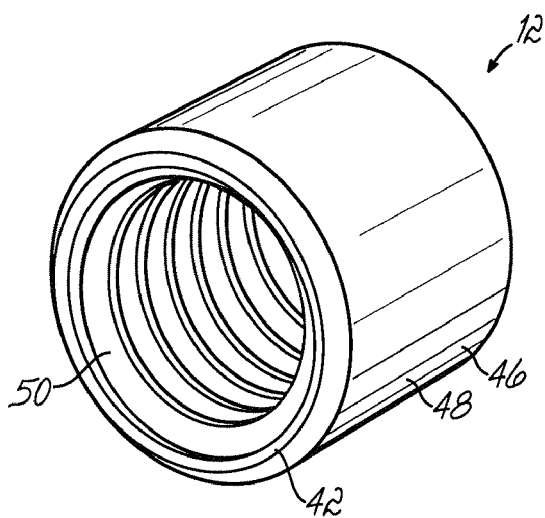
FIG. 4 shows a perspective view of one embodiment of the expander member of this invention.
Figure 8:
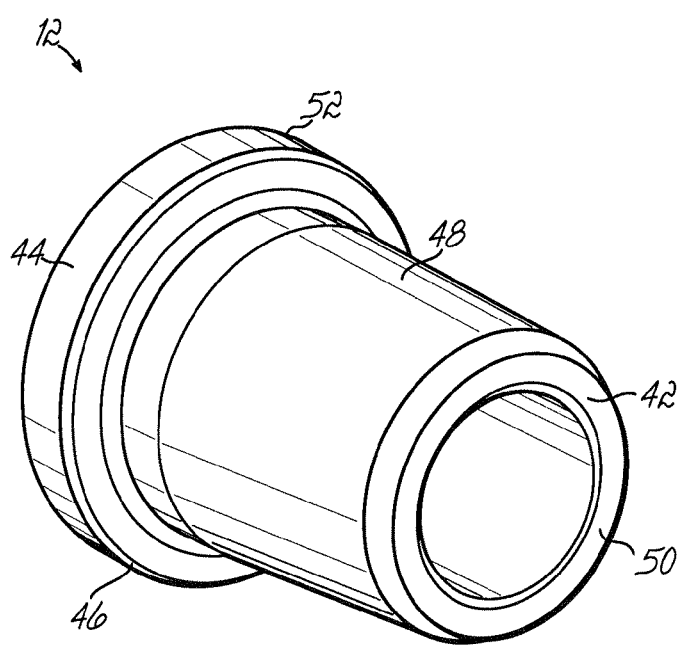
FIG. 8 shows a perspective view of one embodiment of the expander member of this invention.

Referring to FIGS. 4 and 8, the expander member 12 comprises a body 46 having a first end 42 and a second end 44. The outer surface 48 in the preferred embodiment having a frustaconical taper generally conjugate to the taper within the set screw body cavity 22. In the preferred embodiment the outer surface taper 48 is a self-holding taper such as a MORSE, BROWN & SHARPE (JARNO), AMERICAN NATIONAL STANDARD MACHINE TAPER (JACOBS), BRITISH STANDARD TAPERS or the like all well known in the art. Alternatively, other tapers well known in the art suitable for circumferential expansion of the upper portion 28 of the set screw body 11 may be used. The expander member 12 may include an inner bore 50 extending inwardly from said first end of said expander member along a longitudinal centerline for gripping the expander member 12 for extraction from the set screw body 11. The inner surface may also include a driving means such as, but not limited to threads, sockets or slots for engagement with wrenches, screwdrivers and/or an extractor (not shown) used to remove or disconnect the coupling. Alternatively, the expander member 12 may include a flange 52 (FIGS. 6 and 8) at its second end 44, the flange 52 having a larger diameter than the second end 44 of the expander member 12 to remove or disconnect the coupling. In a further alternative embodiment the outer surface of the expander body includes connection means (not shown) which allow the set screw member and the expander member to be interlocked into a coaxially aligned sub-assembly prior to insertion into an aperture. Suitable connection means include adhesives, living hinges and the like.

Figure 5:
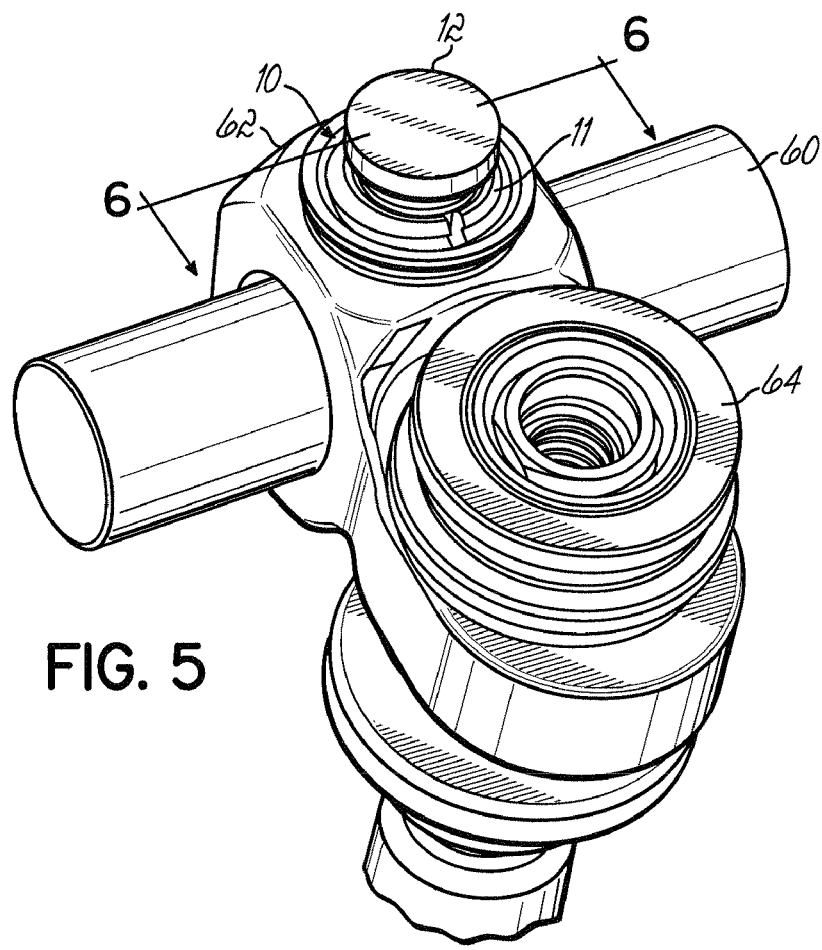
FIG. 5 shows a perspective view of one embodiment of the instant invention being utilized to secure an alignment rod within a lateral support of a pedicle screw.
Figure 6:
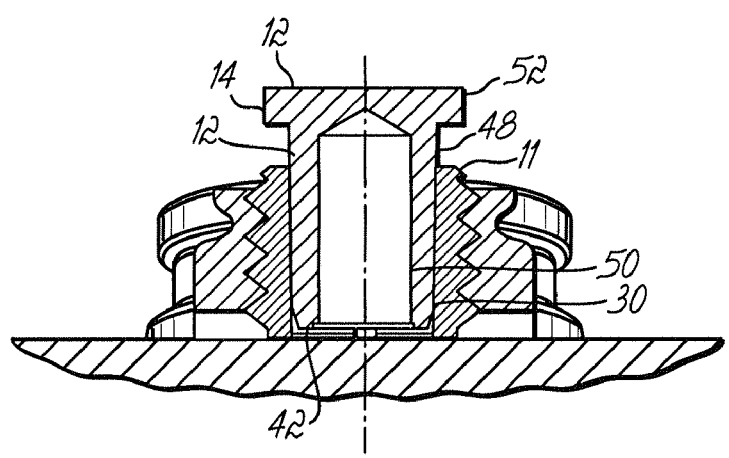
FIG. 6 shows a section view along lines 2—2 of the embodiment illustrated in FIG. 5, illustrating the set screw body member with the expander member in the engaged position.

Referring to FIGS. 5 and 6, the linear engaging headless set screw 10 is illustrated securing an alignment rod 60 within a lateral support 62 of a pedicle screw assembly 64 illustrating the particularly low profile constructions possible with the instant invention.

Figure 9:
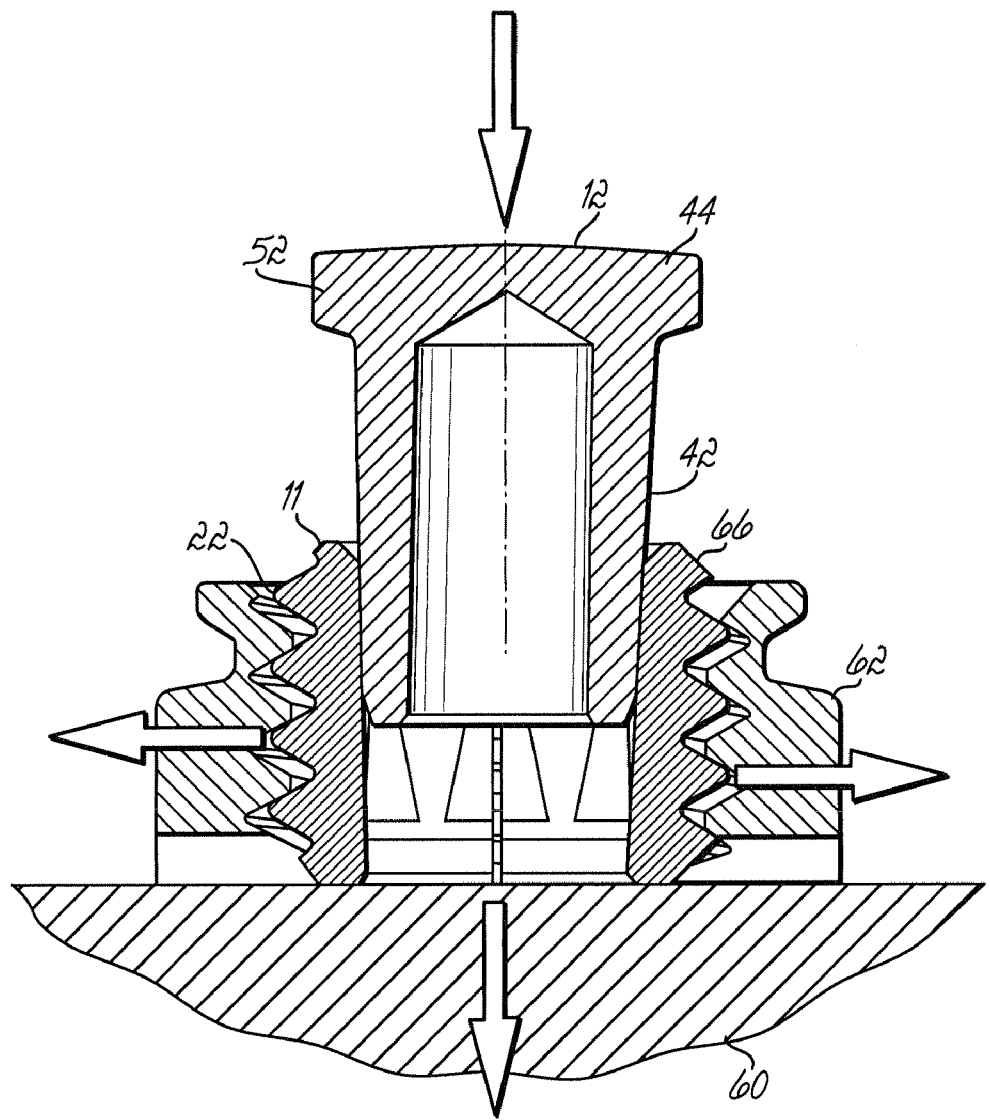
FIG. 9 shows a partial cross sectional view of one embodiment of this invention, illustrating the relative motions that result in the secondary clamping force during assembly of the instant invention.

Referring to FIG. 9, The assembly of one embodiment of the instant invention and relative motion in relation thereto is illustrated. The set screw body 11 is loosely threaded into an aperture 66. The set screw body 11 is tightened to a first torque. Thereafter the first end 42 of the expander member 12 is inserted into the set screw cavity 22. As the expander member 12 is linearly traversed further into the cavity, the set screw body 11 is expanded circumferentially. As the set screw body 11 is expanded, the threaded surfaces cooperate in a helical or circular ramping fashion to force the set screw downward, thereby causing a secondary clamping load between the components. Once the body member 11 is expanded and outer surface 16 of the body member engages the inner surface 40 of the aperture a connection is created that is resistant to undesired loosening. In this manner, the locking set screw system 10 is capable of providing a precise, secure, and reproducible connection between multiple components. The connection also allows full thread engagement and a locking connection without the need for plastic inserts or adhesives.

In an alternative embodiment the set screw body 11 is inserted into the aperture 66 and tightened to a desired torque. The expander member 12 is inserted into the cavity 22 in the first end 18 of the set screw body. As the expander member 12 is pressed into the body cavity 22, the body is expanded circumferentially locking the outer surface 16 of the set screw body 11 against the walls of the aperture 66. Once the body member is expanded and an outer surface of the body member engages the inner surface of the aperture a connection is created that is resistant to undesired loosening.

When compared to traditional threaded set screws, the dual frustaconical compression surfaces utilized in the instant invention allow very precise clamping loads to be applied to the assembled components with or without application of rotational torque. Linear expansion of the set screw member body eliminates torque variations as seen in the prior art due to surface finish, lubrication and thread engagement to achieve a precise clamping load.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A linear engaging headless fastener system for securing an object to a machine component, the fastener system comprising:

a body member having an outer surface positioned about a central axis, said body member having a first end including a cavity, said cavity having an engaging surface, said engaging surface tapering inwardly from about said first end and extending toward a second end, said second end defining a clamping surface adapted to engage the object;

an expander member having a first end, a second end, and an outer surface positioned about a central axis, said outer surface tapering outwardly from said first end and extending toward said second end, said first end being insertable into said body member cavity;

a gripping surface defining an aperture in the machine component; and means projecting radially from said outer surface of said body member outer surface for engagement with said inner surface of said aperture for locking said body member in a predetermined position, wherein said outer surface of said expander member is constructed and arranged for coaxial alignment and engagement with respect to said engaging surface of said body member, said expander member being linearly traversable with respect to said engaging surface of said body member between a first release position and a second engaged position, wherein said engaged position results in said tapered surfaces circumferentially expanding said body member, and wherein said release position results in circumferential contraction of said body member, wherein said body member outer surface and said gripping surface are configured and positionable relative to each other to form a compressive contact with each other to linearly shift relative to each other under the compressive contact to cause an increased compression between the clamping surface and the object when said body member is circumferentially expanded from an unloaded state, wherein said radially projecting means includes at least one outwardly and circumferentially extending rib, each said rib including a first ramp surface to facilitate coaxially aligned linear movement of said body member in relation to said inner gripping surface of said aperture to provide a secondary clamping force upon engagement of said expander member, wherein said at least one circumferentially extending rib includes a second ramp surface to facilitate coaxially aligned linear insertion of said body member into said inner gripping surface of said aperture, and wherein said radially projecting means are helical threads.

2. A linear engaging headless fastener system for securing an object to a machine component, the fastener system comprising:

a body member having an outer surface positioned about a central axis, said body member having a first end including a cavity, said cavity having an engaging surface, said engaging surface tapering inwardly from about said first end and extending toward a second end, said second end defining a clamping surface adapted to engage the object;

an expander member having a first end, a second end, and an outer surface positioned about a central axis, said outer surface tapering outwardly from said first end and extending toward said second end, said first end being insertable into said body member cavity; and a gripping surface defining an aperture in the machine component, wherein said outer surface of said expander member is constructed and arranged for coaxial alignment and engagement with respect to said engaging surface of said body member, said expander member being linearly traversable with respect to said engaging surface of said body member between a first release position and a second engaged position, wherein said engaged position results in said tapered surfaces circumferentially expanding said body member, and wherein said release position results in circumferential contraction of said body member, wherein said body member outer surface and said gripping surface are configured and positionable relative to each other to form a compressive contact with each other to linearly shift relative to each other under the compressive contact to cause an increased compression between the clamping surface and the object when said body member is circumferentially expanded from an unloaded state, wherein said first end of said body member includes at least one driving surface, said at least one driving surface constructed and arranged to cooperate with a driving tool for providing rotational force to said body member.

3. A linear engaging headless fastener system for securing an object to a machine component, the fastener system comprising;

a body member having an outer surface positioned about a central axis, said body member having a first end including a cavity, said cavity having an engaging surface, said engaging surface tapering inwardly from about said first end and extending toward a second end, said second end defining a clamping surface adapted to engage the object;

an expander member having a first end, a second end, and an outer surface positioned about a central axis, said outer surface tapering outwardly from said first end and extending toward said second end, said first end being insertable into said body member cavity; and a gripping surface defining an aperture in the machine component, wherein said outer surface of said expander member is constructed and arranged for coaxial alignment and engagement with respect to said engaging surface of said body member, said expander member being linearly traversable with respect to said engaging surface of said body member between a first release position and a second engaged position, wherein said engaged position results in said tapered surfaces circumferentially expanding said body member, and wherein said release position results in circumferential contraction of said body member, wherein said body member outer surface and said gripping surface are configured and positionable relative to each other to form a compressive contact with each other to linearly shift relative to each other under the compressive contact to cause an increased compression between the clamping surface and the object when said body member is circumferentially expanded from an unloaded state, wherein said first end of said body member includes a plurality of driving surfaces, said plurality of driving surfaces constructed and arranged to cooperate with a driving tool for providing rotational force to said body member.

4. The linear engaging fastener system of claim 3 wherein said plurality of driving surfaces are adapted to cooperate with a hex-shaped tool.

5. A fastener comprising:

a body member defining a longitudinal axis and comprising a clamping end adapted to engage an object to be fastened, and an expandable portion radially expandable relative to the longitudinal axis, the expandable portion having an inner surface defining a cavity in the body member and an outer surface;

an expander member having an outer surface and sized to be at least partially positionable inside the cavity of the body member; and a machinery component comprising a gripping surface defining a cavity sized to accommodate at least a portion of the expandable portion of the body member and to engage the outer surface of the body member, wherein the outer surface of the expander member and the inner surface of the expandable portion of the body member are configured to cooperate to radially expand the expandable portion when the expander member axially slides along the longitudinal axis, and wherein the outer surface of the expandable portion of the body member and the gripping surface are configured to cooperate to push the body member along the longitudinal axis relative to the gripping surface, thereby compressively engaging the clamping end with the object to be fastened, as the expandable portion radially expands, wherein at least one of the outer surface of the expander member and the inner surface of the expandable portion of the body member has a portion at an angle from the longitudinal axis and adapted to remain in contact with the other one of the outer surface of the expander member and the inner surface of the expandable portion of the body member during the longitudinal advancement of the expander member wherein at least one of the outer surface of the expandable portion of the body member and the gripping surface has a portion at an angle from the longitudinal axis and adapted to remain in contact with the other one of the outer surface of the expandable portion of the body member and the gripping surface during the radial expansion of the expandable portion of the body member, wherein the outer surface of the expandable portion of the body member and the gripping surface comprise matching ribbed surfaces.

6. The fastener of claim 5, wherein the matching ribbed surfaces comprise matching threaded surfaces.

* * * * *